Figure 1:
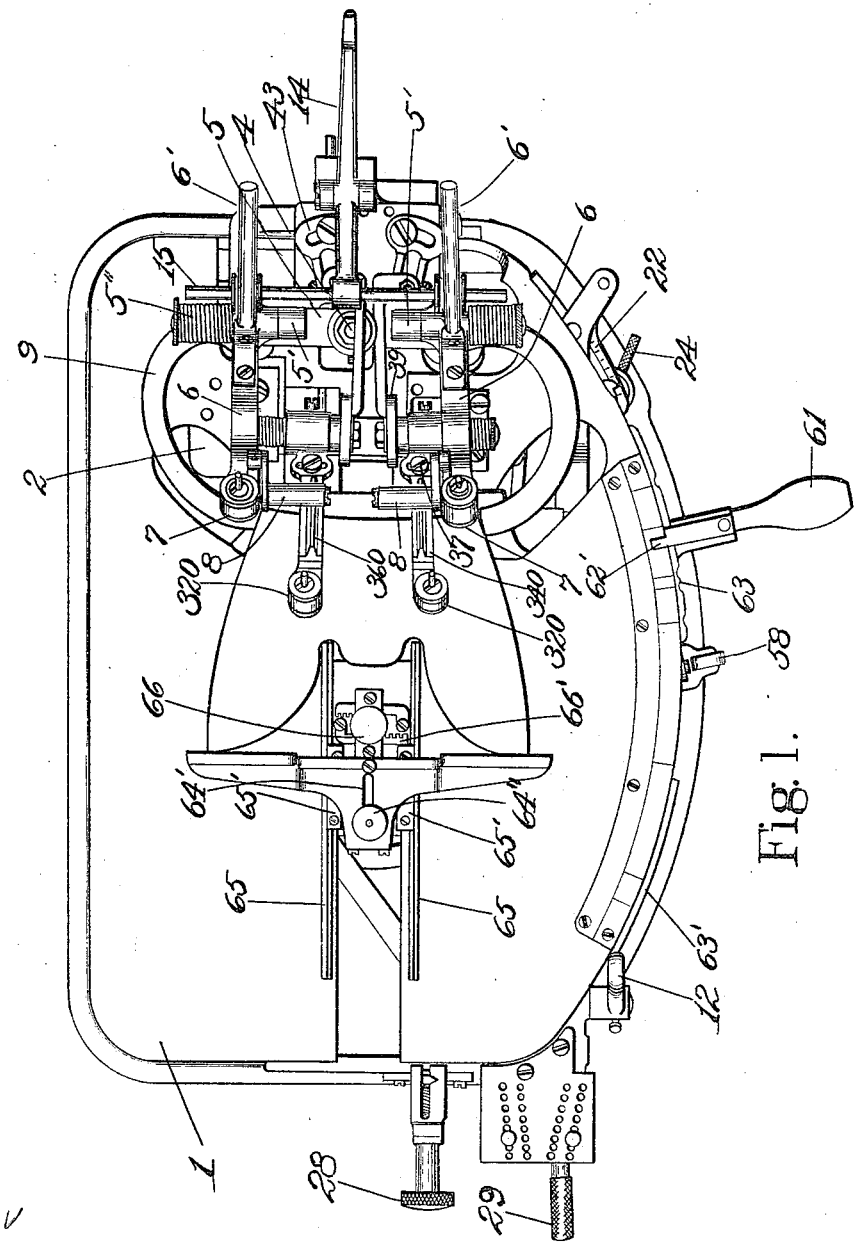

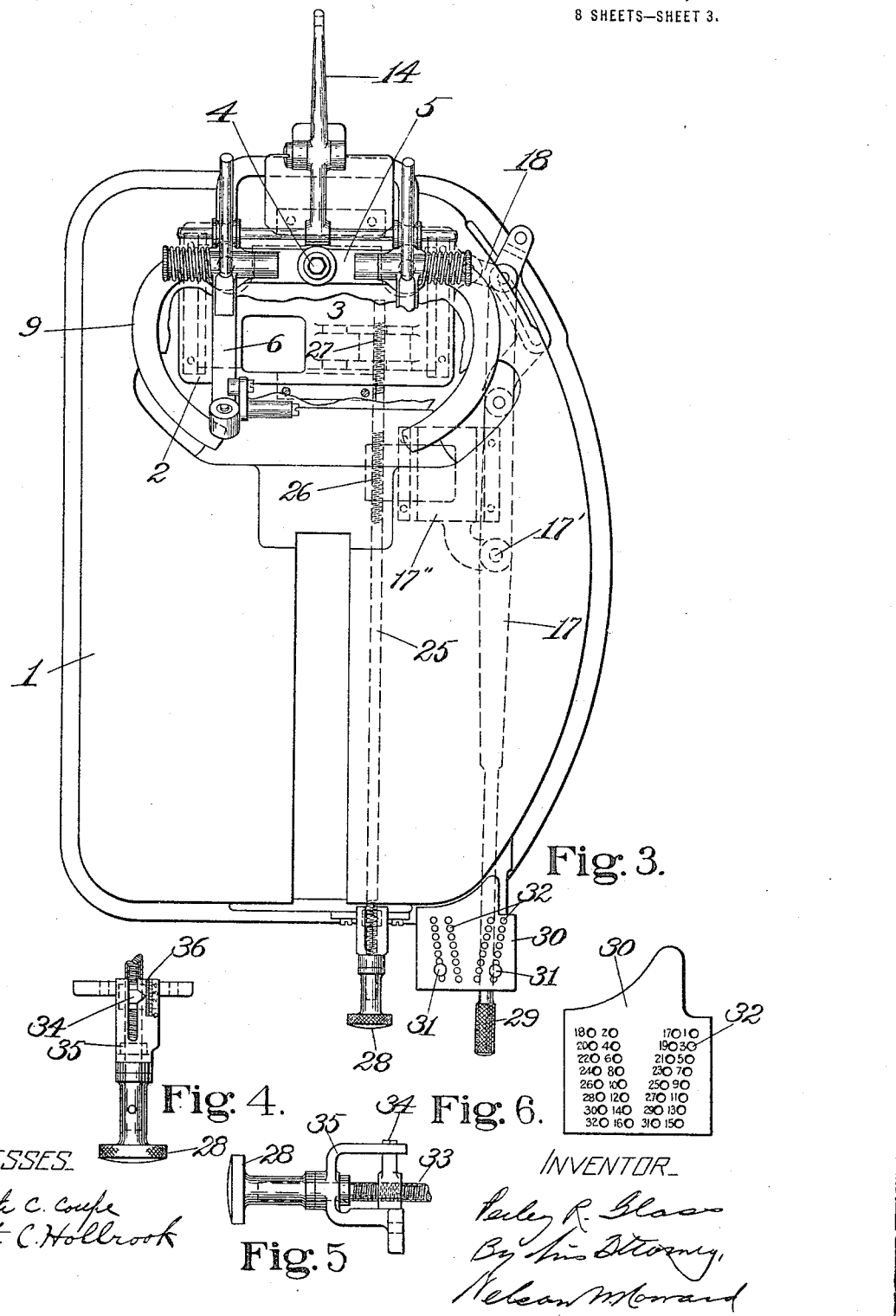

P. R. GLASS.
VAMP MARKING MACHINE.
APPLICATION FILED DEC. 11, 1908.
1,141,329.
Patented June 1, 1915.
8 SHEETS—SHEET 5.
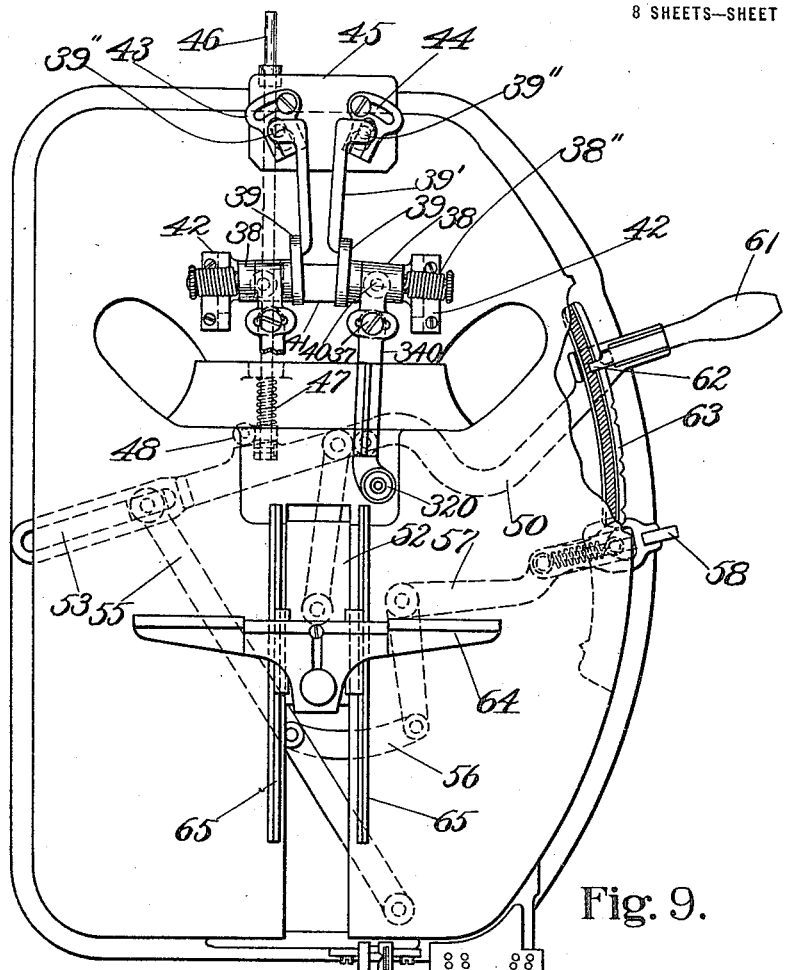
Fig. 9.
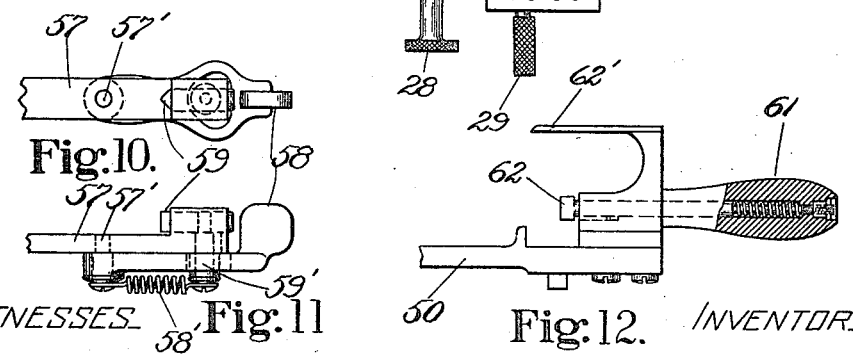
Fig. 10.
Fig. 11.
Fig. 12.
WITNESSES
Elizabeth C. Coupe
Edith C. Holbrook
INVENTOR
Perley R. Glass
By his Attorneys,
Nelson W. Howard
THE NORRIS PETERS CO., PHOTO-LITHO., WASHINGTON, D. C.

P. R. GLASS.
VAMP MARKING MACHINE.
APPLICATION FILED DEC. 11, 1908.

1,141,329.

Patented June 1, 1915.
8 SHEETS—SHEET 6.

| VAMP CHART. | | | | |
| --- | --- | --- | --- | --- |
| BALS. | | | | |
| Size | Style | R. | L. | Swing. |
| 11/C #7 | 2 | 26 – | 21 | 13 |
| 11/C #12 | 2½ | 26 – | 21 | 10 |
| 8/C #7 | 1½ | 30 – | 25 | 16 |
| 8/C #12 | 2 | 28 – | 25 | 12 |
| 5/C #7 | 1½ | 28 – | 23 | 10 |
| 5/C #12 | 2 | 28 – | 23 | 10 |
| OXFORDS. | | | | |
| 11/C #4½ | 1⅛ | 30 – | 29 | 16 |
| 11/C #6 | 1½ | 28 – | 27 | 16 |
| 8/C #4½ | 1¾ | 30 – | 27 | 16 |
| 8/C #6 | 1¾ | 28 – | 23 | 13 |
| 5/C #4½ | 1½ | 28 – | 25 | 11 |
| 5/C #6 | 2 | 30 – | 25 | 14 |
| BLUCHERS | | | | |
| 11/C #4½ | 1¾ | 30 – | 27 | 9 |
| 8/C #4½ | 1¾ | 30 – | 27 | 5 |
| 5/C #4½ | 1¾ | 30 – | 27 | 9 |

P. R. GLASS.
VAMP MARKING MACHINE.
APPLICATION FILED DEC. 11, 1908.

1,141,329.

Patented June 1, 1915.
8 SHEETS—SHEET 8.

WITNESSES.
Elizabeth C. Coupe
Edith C. Holbrook

INVENTOR.
Parley R. Glass
By his Attorney,
Nelson W. Howard

UNITED STATES PATENT OFFICE.

PERLEY R. GLASS, OF BROOKLINE, MASSACHUSETTS, ASSIGNOR TO UNITED SHOE MACHINERY COMPANY, OF PATERSON, NEW JERSEY, A CORPORATION OF NEW JERSEY.

VAMP-MARKING MACHINE.

1,141,329. Specification of Letters Patent. Patented June 1, 1915.

Application filed December 11, 1908. Serial No. 467,075.

*To all whom it may concern:*

Be it known that I, PERLEY R. GLASS, a citizen of the United States, and resident of Brookline, in the county of Norfolk and State of Massachusetts, have invented certain Improvements in Vamp-Marking Machines, of which the following description, in connection with the accompanying drawings, is a specification, like reference characters on the drawings indicating like parts in the several figures.

This invention relates to vamp marking machines and more particularly to machines of this type which are adapted to place marks on a vamp to indicate the position of a toe cap, and to furthermore, if desired, place other marks on a vamp to indicate the position of the quarters.

The operation of marking a vamp to indicate the position of the toe cap thereon is a very particular one, and should, in the best work, be performed with extreme accuracy and care. In the case of a machine, it is essential that it be so constructed as to position a vamp of any known type or size, relatively to the markers, and to place on such vamp while so positioned, the marks at the proper points for the toe-cap to be subsequently attached to the vamp, and such operation should be so performed that the marks are applied at precisely the same points, on every vamp of a given type and size, to insure absolute uniformity of appearance in the finished shoes.

In some prior machines for marking vamps movable gages have been employed to enter the throat of the vamp and to advance the vamp in position to permit a set of movable markers to apply indicating indentations, or other suitable marks thereon, to determine the position of the toe-cap. In such prior machines, however, no provision was made to insure the presentation of the vamp to the markers in such manner that the marks would be made thereon at exactly the same distance from the edges on opposite sides of the vamp, and hence the operator frequently was called upon to adjust the vamp in a lateral direction by hand, and to be guided solely by his eye in making such adjustment.

An important feature of this invention, in such connection, consists in the provision, in a machine of this class, of means having a fixed relation to a marker and arranged to accurately position the vamp so as to insure the marking of the vamp at a definite distance from an edge thereof. In the case of a machine employing two marking devices for operation upon the vamp at separated points near the opposite edges of the vamp, said means would be associated with each marker in order to determine the location of the two marks at points equidistant from such opposite edges.

In the preferred embodiment of the invention, the positioning means which is associated with each marking device is in the form of a gage, and two of such gages with their marking devices are arranged for simultaneous movements in opposite directions, by suitable means, whereby they may be opened to receive a vamp, or may be closed to embrace the opposite edges of a vamp therebetween. This arrangement insures the location of the marks at equidistant points from the opposite edges of the vamp, as aforesaid, in a very reliable manner, and, moreover, adapts the machine for operation upon vamps of varying widths.

Preferably, the marking devices are carried by pivotal arms, to permit their movement toward and from the bed of the machine, and each arm and its associated gage is supported by pivotal, or other equivalent means, upon a suitable carriage, for simultaneous movements toward and from the opposite edges of a vamp to be located upon said bed, appropriate devices being employed for causing such movements, and which may be conveniently controlled from the front of the machine, or from any other suitable point thereon. The pivotal arms carrying the marking devices are preferably also provided with rearwardly-extending members, and located beneath said members a rod, or other device, carried by an operating lever, constitutes a simple means for causing a simultaneous depression of the pivotal arms to cause the marking devices to operate upon a vamp.

As it is necessary to locate the marks indicating the position for the attachment of a toe-cap to a vamp for a right shoe to one side of the marks for the attachment of a toe-cap for a left shoe, an important feature of this invention consists in providing means whereby a set of markers may be moved simultaneously in opposite directions transversely of the machine, to provide for marking a vamp for a right shoe, or a left shoe. While this means for the best results would preferably be employed in connection with marking devices associated with gages to engage the opposite edges of a vamp in order to position the marking devices relatively to such edges, as above described, it is to be understood that said means is not to be confined to use with such an arrangement, as it is obvious that it could be advantageously employed in connection with many other forms of marking device than that herein described.

In order to permit the simultaneous, transverse movements of the markers, such markers are preferably supported on a carriage which may be slidably mounted, in ways or the like, below the surface of the bed of the machine, and such carriage may be shifted by a lever whose controlling end extends to a point within convenient reach of the operator. In order to limit the extent of the lateral movements of this lever I may provide, adjacent the end of such lever, a plate having two or more rows of apertures on each side of its center to receive two shiftable stop pins, said apertures being numbered to agree with suitable numerals on a chart indicating the appropriate positions for the stop pins, to control the lateral positions of the markers for rights and lefts of different kinds and sizes of vamps.

In marking vamps for shoes to be formed on crooked lasts it is necessary that the marks shall be so located that the position of the toe-cap on the vamp will agree with the "swing" of the last, or in other words, with the inclination of the median line of the fore-part to the direction of the median line of the heel-part. This requires that the mark for the toe-cap on the outer side of a right or a left vamp shall be placed at a shorter distance from the front edge of the vamp than the mark on the inner side thereof. The amount of this "swing" varies in different makes and styles of shoes, being greater in some cases than it is in others, and an important feature of the present invention in this connection consists in so arranging the marking devices that they will be caused to move in substantially opposite directions longitudinally of the vamp, simultaneously with their lateral movements, whereby to position the marks for the toe-cap properly for the "swing" of the last of the particular vamp being marked. In the preferred construction, the markers are supported for such movements upon a pivot, or the like, sustained by the sliding carriage, and substantially coincident with the longitudinal center of the bed of the machine, said pivot, as herein shown, carrying an arm to which is pivoted one end of a link whose opposite end is connected with, and is adjustable along, the short arm of the lever which shifts the sliding carriage transversely of the machine. The adjusting means for this link has a pointer which moves along a graduated scale, and the end of the link may be so positioned along this scale as to cause the lever to impart to the markers, through the link and its pivot arm, simultaneously with the lateral movements of the sliding carriage, oscillating movements whose extent will vary according to the distance of the attaching point of the link from the end of the lever. These oscillating movements will serve to cause the marking devices to swing in substantially opposite directions, appropriate distances, as determined by the adjustment of the link along the scale, to position the marks for the amount of "swing" required for the various sizes and shapes of shoes, as determined by the numerals upon the vamp chart.

Various styles of shoes differ in that the toe-cap is positioned at a point which is located farther forward on the vamp in some styles than it is in others. In order to adjust the marking devices at different distances from the front edges of vamps to accord with such variations in style, I arrange the markers for bodily, simultaneous movements, longitudinally of the machine. Preferably, to permit these movements the markers are supported upon a carriage, which in the present embodiment of the invention is carried by the carriage hereinbefore mentioned, and slides therein in a direction at right angles to the line of movement of said carriage. A rod, or equivalent device, is preferably in screw-threaded or other engagement with the longitudinally movable carriage, and said rod, which extends to convenient position for operation, has a movable pointer to indicate on a scale the positions of the markers for marking vamps for various styles of shoes, as shown by their appropriate numerals on the vamp chart.

A further feature of importance of this invention consists in an arrangement of auxiliary making devices to apply to vamps for Blucher shoes the marks which serve to indicate the points of attachment for the quarters. In the preferred construction, these marking devices are mounted upon arms, movably supported upon the bed of the machine, and arranged to be normally held above said bed, as by springs, or the like, but capable of being actuated, when desired, to mark a vamp. The arrangement is such that the auxiliary marking devices are depressed by means carried by the main marking devices when the latter are depressed to mark the vamp to indicate the position of the toe-cap. Such auxiliary markers are also, preferably, supported for bodily movements longitudinally of the machine, and for simultaneous pivotal movements about vertical axes, whereby, when suitably actuated in conjunction with a gage-actuating mechanism, the auxiliary markers will be caused to advance or to retreat, on divergent or convergent lines, simultaneously with the movements of the back gage, whereby to mark the proper points on a vamp for the attachment of the quarters of different sizes of shoes, as determined by the position of such gage.

Still another very important feature of this invention comprises an improved gage mechanism which is constructed and arranged to engage both the rear extremities of a vamp and the throat thereof in order to advance the vamp with certainty and precision to proper position beneath the marking devices. While an arrangement of gages constructed to engage the vamp at these several points is very effective in positioning a vamp in conjunction with the gages for contacting with the vamp at its opposite forward edges, above referred to, many of the benefits of this arrangement would be secured if the same was employed without said forward edge gages, and I therefore intend to claim such arrangement of gages broadly.

The gages for advancing the vamp to the marking devices are preferably supported upon a carriage which is slidably mounted for movements along the longitudinal center of the bed of the machine, and these gages have a suitable operating mechanism which is capable of adjustment to position the gages for long vamps, or for short vamps, of all sizes and types. Inasmuch as the gages when operating to position short vamps, as for oxfords or bluchers, are much nearer to the marking devices than when they are operating to position long vamps, as for balmorals, their shifting mechanism must be arranged to move them from their position for long vamps to their position for short vamps, and to furthermore adjust the gages for the several sizes of long or short vamps, while the gages occupy these respective positions. The best construction now known to me for imparting to the gages these several movements, comprises a lever which, preferably, extends beneath the bed of the machine and is connected by a link with the gage carriage at an intermediate point between its fulcrum and its operating extremity, said extremity extending beyond the bed of the machine and in convenient reach of the operator. The fulcrum of this lever may be in the form of a block which is slidably adjustable along a slot in the other extremity of the lever by suitable means, as by an arm which is pivoted to the bed of the machine so as to be swung thereon and a bell-crank lever having a link connection with said arm and arranged in position for actuation by the operator. When the block constituting the fulcrum of the lever is shifted toward the outer end of the slot the lever may be moved toward the front end of the machine to position the gages for long vamps; and when said block is shifted toward the inner end of the slot the lever may be moved toward the rear end of the machine to position the gages for short vamps. When the gages are moved into the position appropriate for short vamps, as for instance bluchers, the operating lever is arranged to move the auxiliary markers to the rear, and through suitable mechanism, to simultaneously cause said markers to move toward the center of the machine in order to provide for making the marks to denote the points for the attachment of the quarters at varying distances apart, which decrease progressively in direct proportion to the decrease in the size of the vamps, and vice versa.

As the throats in long vamps are longer than the throats in short vamps, I have provided, as a further feature of this invention, a throat-gage which is mounted for adjustment relatively to the back-gage, whereby said throat-gage may be projected varying distances in order to completely engage with the throats of vamps of any length, while the rear extremities of such vamps are in contact with the back-gage. In its preferred construction the throat-gage comprises two freely slidable members supported for such movement upon pivotal, laterally adjustable blocks, on the gage carriage.

Other important features of the invention, including improved details of construction and combinations of parts, will be hereinafter more particularly described and claimed.

In the accompanying drawings, forming a part of this specification, the same reference characters refer to the same parts throughout.

Figure 2:
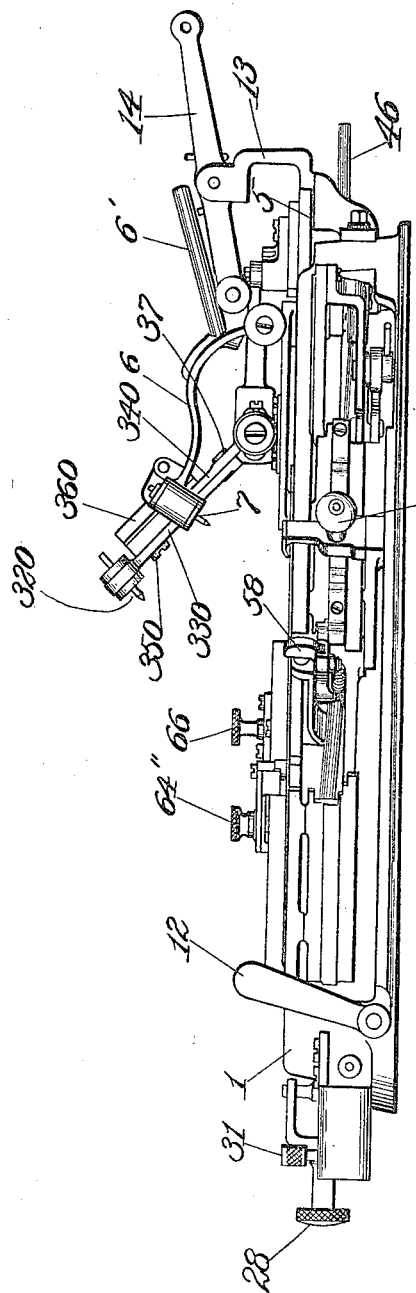
Figure 7:
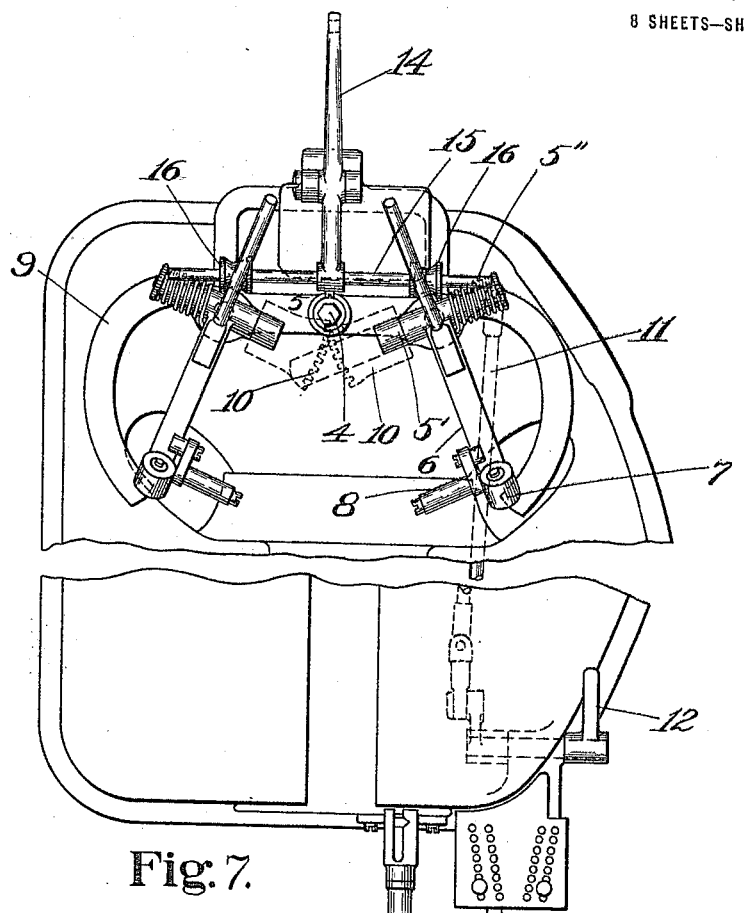
Figure 8:
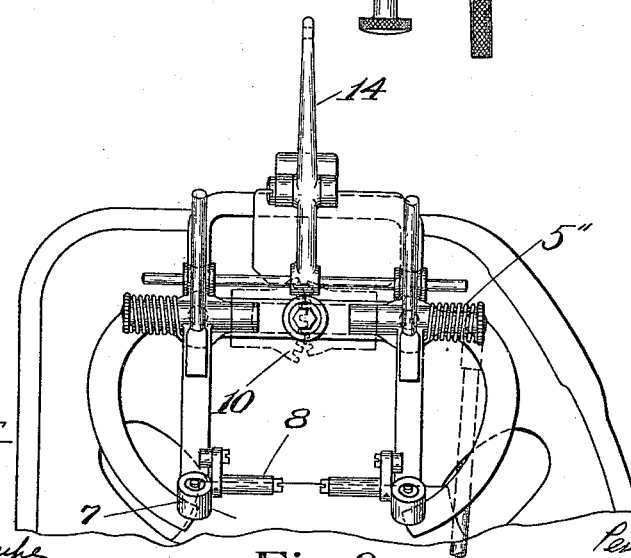
Figure 13:
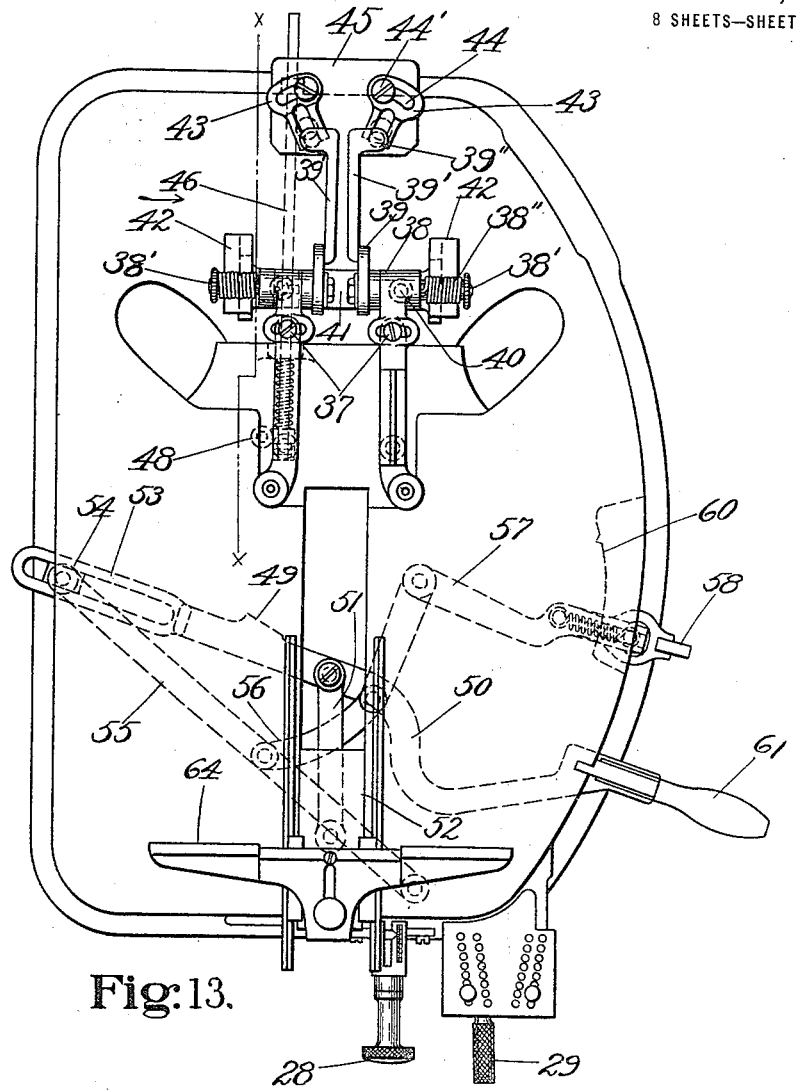
Figure 14:
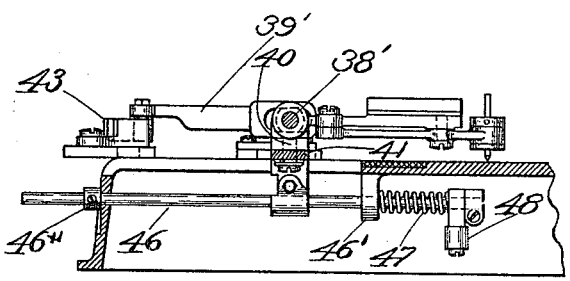
Figure 18:
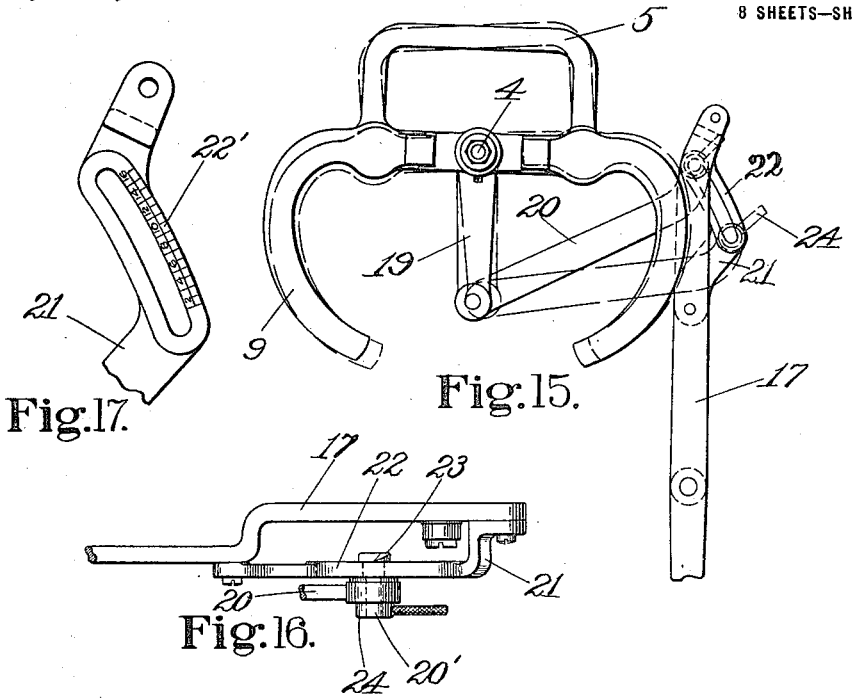
Figure 19:
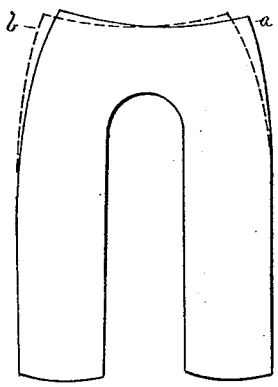
Figure 20:
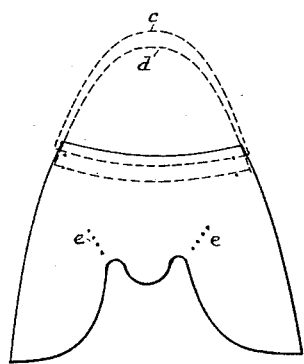
Figure 21:
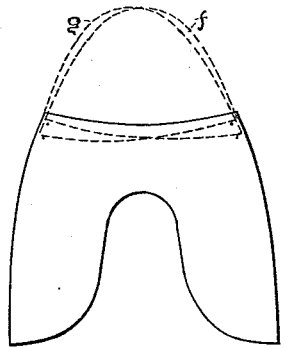
Figure 22:
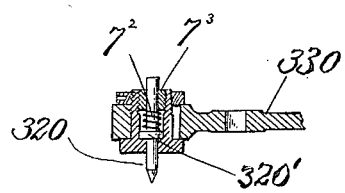

Figure 1 represents a plan view of a vamp-marking machine constructed in accordance with the invention, with a vamp for a Blucher shoe in position to be marked thereby. Fig. 2 represents a side elevation of the machine. Fig. 3 represents a plan view with some of the marking devices removed in order to show, in dotted lines, the mechanism for giving the longitudinal and lateral movements to the marking devices. Fig. 4 represents a plan view of the mechanism for adjusting the markers for variations in style. Fig. 5 shows the same in side elevation. Fig. 6 represents, in plan, the scale for determining the adjustments of the markers for rights and lefts. Fig. 7 represents a plan of the machine, with certain parts omitted or broken away, illustrating the toe-cap marking devices and their gages in open position, together with the operating mechanism therefor. Fig. 8 is a similar view of the rear portion of the machine, showing the toe-cap marking devices in closed position. Fig. 9 is a plan view illustrating the gage operating mechanism and the auxiliary marking devices in retracted position, certain parts being omitted for clearness of illustration. Fig. 10 illustrates, in plan, the setting device for the adjusting mechanism for the gage operating lever. Fig. 11 illustrates a side elevation thereof. Fig. 12 is a view in side elevation, partly sectional, of the handle for the operating lever of the gage mechanism. Fig. 13 is a plan view, similar to Fig. 9, but showing the auxiliary marking devices and the gage mechanism in different positions. Fig. 14 is a longitudinal sectional view on the line x—x, Fig. 13, looking in the direction indicated by the arrow. Fig. 15 is a detail view in plan of the side gages and a portion of their operating mechanism, illustrating, diagrammatically, the effect of the adjustments for variations in "swing." Fig. 16 is a side elevation of the end of the operating lever, the scale and adjusting device for variations in "swing." Fig. 17 is a detail view of the scale upon which are made the adjustments for variations in "swing." Fig. 18 is a view of the vamp chart to be used with a machine embodying this invention. Figs. 19, 20 and 21 illustrates three different types of vamp to be marked upon a machine made in accordance with this invention, the effect of the different adjustments of the machine being indicated, diagrammatically, by dotted lines in said views. Fig. 22 is a detail.

The numeral 1 refers to the main frame or bed of the machine, the same being provided with an upper surface suitable to support a vamp. Near the rear end of such bed, and preferably below its surface, a carriage 2 is mounted to slide transversely of the machine, in suitable guideways provided therefor, which carriage supports a second carriage 3, mounted for movements longitudinally of the machine in guideways, or the like, located on the carriage 2. A pivot bolt 4 is centrally journaled in the carriage 3, and rigidly connected to said bolt is a frame 5 upon which are pivotally supported, on vertical axes, the brackets 5', 5', supporting in turn horizontal spindles, or the like, to serve as bearings for the arms 6, 6, whose forward ends carry the markers 7, 7, and extending rearwardly therefrom are arms 6', 6', springs 5'', 5'', being appropriately connected with the arms 6, 6, to normally raise the markers above the surface of the bed of the machine. Extending inwardly from the arms 6, 6 are suitable projections 8, 8, the purpose of which will hereinafter appear.

The gages 9, 9, extend rigidly from the brackets 5' and the end of each gage is located a predetermined distance from the point occupied by the marker with which it is associated when the latter is depressed to mark the vamp. The pivots supporting the brackets 5', 5', are preferably extended below the bed of the machine, and rigid therewith are two intermeshing segmental gears 10, 10, as shown in Figs. 7 and 8, and connected with an extension from one of said pivots is a link 11 which extends, preferably, to a bell-crank lever located in convenient position near the front of the machine and provided with an operating handle 12. By this means the toe-cap markers and their associated gages may be simultaneously moved in opposite directions to receive a vamp, as shown in Fig. 7, and may be subsequently moved to a closed position to enable the gages to engage the opposite edges of the vamp and to locate the same accurately with relation to the markers, as shown in Figs. 1 and 8.

The frame 5 is provided with an upwardly extending bracket 13, which, as herein shown, is forked to receive a pivotal support for a lever 14, whose forward end carries a rod 15 extending transversely on opposite sides of said lever, grooved rolls 16, 16 being loosely journaled upon said rod, said rolls serving to engage the arms 6', 6', in any of the several positions occupied by these arms to be described, whereby to enable the markers for indicating the position of the toe-cap to be depressed by the lever 14.

A lever 17 is, as herein shown, located below the bed of the machine and fulcrumed to a bracket 17'' which, for a purpose to be hereinafter described, is mounted to slide in guideways secured below the surface of the bed. The inner end of the lever 17 is connected by a link 18 to the carriage 2, and the outer end of said lever is herein shown as having a handle 29, whereby to shift said carriage, the markers 7, and their associated gages 9, in opposite directions transversely to the median line of the bed. A plate 30 secured to the bed 1 near its front end extends over the adjacent part of the lever 17, and said plate may be provided with two convergent rows of perforations 32, to be numbered in the manner shown in Fig. 6, said perforations being constructed to receive the stop pins 31, 31, in order to limit, adjustably, the movements in opposite directions of said lever, and hence of the markers and their gages. Extending forwardly from the pivot 4 is a rigid crank arm 19, and a link 20 has one end in pivotal engagement with said crank arm, its other end being carried by a stud 20' extending through a slot in a bracket 21 secured below the inner end of the lever 17, the bracket having a scale along said slot, as shown in Fig. 17. The stud 20' carries at its upper extremity a pointer 23, the stud being movable along the slot and the pointer having a suitable device, as a nut provided with a handle 24, to engage a thread at the lower end of the stud 20', whereby to fixedly secure the end of the link 20 in any of the positions to which it may be moved along the slot in the bracket 21. With this construction, as will be apparent from Fig. 15 of the drawings, when the free end of the link 20 is adjusted to position in the outer extremity of the slot, if the carriage 2 be shifted in either direction by the lever 17 the frame 5 and markers will move transversely of the bed but no pivotal movement of these parts can take place about the bolt 4. When the link 20 is moved along the slot from the position shown by full lines in Fig. 15, to the position shown by dotted lines therein, by reason of the fact that the end of the link is then located nearer the fulcrum of the lever 17 than the point of attachment of said lever with the carriage 2, the frame 5 and markers 7 and their gages will be caused to turn about the point occupied by the bolt 4 as a center, and the extent of this movement will be dependent upon the distance of the free end of the link 20 from the inner end of the lever. The oscillations of the markers and their gages serve to determine the relative distances of the markers for the opposite forward corners of the vamp from the ends thereof, and hence the positions to be occupied by toe caps for vamps of shoes having varying degrees of "swing." By loosening the adjusting nut 24 the free end of the link 20 may be positioned along the slot and opposite the numeral on the scale which corresponds with a numeral on the vamp chart denoting the appropriate amount of "swing" required for the particular vamp being marked.

The carriage 3 is, as heretofore described, mounted for sliding movements longitudinally of the machine in the carriage 2, and a practical construction for causing such movements is herein illustrated as comprising a rod 25, located below the bed of the machine, and threaded, as at 27, to engage a threaded opening in a block which may be located in a slideway on the carriage 3, as shown by dotted lines in Fig. 3. The rod 25 is also, as shown in this figure, provided with a screw thread 26 to engage the sliding bracket which carries the fulcrum 17', and by this construction the rod may cause longitudinal movements of the carriage 3 and the markers 7 and gages 9 thereon, to position said markers and gages at different points longitudinally of a vamp in order to mark the vamp at such points for toe-caps involving variations in style, the lever 17 being, as shown, made to follow the movements of the carriage 3 in these adjustments, whereby the operative relation of the lever to the markers and their gages will not be disturbed. The forward end of the rod 25 is provided with a handle 28, rigid therewith, said handle serving to permit the operator to rotate the rod in order to affect the longitudinal adjustments of the carriage and markers. The upper surface of the bracket 35 may be slotted and provided along said slot with a scale 36, having thereon numerals to agree with numerals denoting the proper adjustments for different styles on the vamp chart, and an index or pointer 34 is herein shown as having an internally threaded hub to engage a thread 33 upon the rod 25, said pointer being thereby caused to move along the scale as the rod is rotated to coöperate with the numerals thereon.

The auxiliary markers for indicating the position of the quarters on vamps for shoes of the Blucher type, or the like, are denoted by numerals 320, 320, said markers being mounted upon arms 330 which are pivotally connected for radial adjustment upon arms 340 by the pivots 350. The inner ends of the arms 340 are, as herein shown, provided with slots in order to permit the adjustment of arms 330 about the pivots 350, said slots being entered by screws 37 whose terminals are in threaded engagement with perforations at the inner ends of the arms 330. The arms 340 are herein shown as provided with ribs 360 to engage the extensions 8 on the arms 6 of the main markers, and are furthermore provided with apertured bosses 38 which may be journaled upon studs 38' projecting in opposite directions from two brackets 39, 39, said brackets being pivotally connected, as indicated at 40, to a carriage 41. As herein shown, the bed of the machine is provided with ways 42, 42, which slidingly receive the ends of the carriage 41, and a rod 46 sliding in guideways below the bed is connected with the carriage 41 at an intermediate point, and has a roll 48, at or near its forward end, to be engaged by a cam surface 49 upon a lever 50, whereby to move said carriage and the auxiliary markers in a rearward direction. The rod 46 is preferably normally urged in a forward direction by a spring 47, which is confined between a perforated boss 46', projecting from the bed of the machine and in which said rod is guided, and a clip, which may be clamped to the inner end of the rod for supporting the roller 48. A collar 46", or similar stop device, is secured, adjustably, near the outer terminal of the rod in order to control the tension of the spring 47 and to serve as a stop to limit the movement of the rod in a forward direction.

In a suitable position, at or near the rear of the bed of the machine, a plate or similar support 45 is provided upon which are located two guides 43, 43, the same having curved slots 44, 44, to receive screws 44', 44' for adjustably securing said guides to the plate 45. These guides are provided with ways, as shown in Figs. 9 and 13, which are arranged to diverge rearwardly, and receive studs 39'' projecting from a pair of arms 39', 39', each of which is rigid with one of the brackets 39 and extends rearwardly therefrom, as shown. With this construction, when the lever 50 is moved in a direction to cause the surface 49 thereon to engage the roller 48, the spring 47 is compressed and the rod 46, together with the carriage 41 and the auxiliary markers, are moved rearwardly, the ways in the guides 43 acting on the studs 39'' to cause the arms 39' to separate and thereby rotate the brackets 39 about the pivots 40, which causes the auxiliary markers to approach each other, or in other words, to move toward the central or median line of the bed of the machine. If the lever 50 is moved in an opposite direction, the spring 47 will be permitted to expand and the rod 46 will carry the auxiliary markers in a forward direction, opposite to that just described, and said markers will separate or increase their distance from the median line of the bed of the machine.

From the construction above described it will be seen that when it is desired to apply to vamps for Blucher shoes the marks which serve to indicate the points of attachment for the quarters, the handle 12 is first moved in a backward direction to separate the markers 7 and their gages 9. The auxiliary markers, which are normally held above the projections 8, preferably by yielding means, herein shown as torsion springs 38'' having their ends secured to the bosses 38 and the rods 38', are depressed below the plane thereof, and the handle 12 is turned in an opposite direction, thereby locating said projections above the ribs 360 which will be maintained in engagement with the projections 8 by the springs 38''. If the rear end of the lever 14 be now depressed the rod 15 will be elevated, and through the rollers 16 the extensions 6' will be raised to cause a depression of the arms 6, and, through the engagement of the projections 8 with the ribs 360 on the arms sustaining the auxiliary markers, the latter will be depressed to mark the points on the vamp for the attachment of the quarters, the distance of said marks from the median line of the vamp for different sizes of vamps being governed by the location of the carriage 41 in its guideways 42, as heretofore explained. The length of the projections 8 is such that they will permit the gages 9 to be separated a sufficient distance to permit the removal of a vamp that has been marked, and the insertion of another vamp to be marked, without releasing of the markers 320 from their position beneath the projections. After a number of vamps requiring indicating marks for the position of quarters have been thus operated upon by both sets of markers, and it is desired to suspend the operation of the markers 320, the handle 12 is moved back so as to separate the projections 8 sufficiently to allow the springs 38'' to raise these markers into their inoperative position.

The gage mechanism for advancing the vamp to the marking devices preferably comprises a carriage 52 which is slidably mounted for movements longitudinally of the bed of the machine, and as herein shown said carriage moves in guideways formed in a central slot extending a suitable distance rearwardly from the front of the machine. The carriage 52 supports a back gage 64 which is constructed to coöperate with the rear extremities of a vamp, and said carriage also supports a throat gage 65, herein shown as comprising two members which are mounted to slide freely in guide blocks, or the like, 65'. The blocks 65' have link connections with a stud which moves in a longitudinal slot 64' in the gage 64, and this stud may be threaded to receive a thumb nut 64''. Racks 66' are pivotally connected to the blocks 65' and are engaged by a pinion carried by a stud having a handle 66. By this construction, the members of the throat gage may be adjusted relatively to the back gage, in order to be projected varying distances to agree with the throats of vamps of different lengths, and the members of said throat gage may be furthermore adjusted laterally to agree with the throats of vamps of different widths.

The various adjustments of the gages for advancing and positioning vamps relatively to the markers are effected through the lever 50 which, as herein shown, is provided at its inner end with a slot 53 in which a block 54 is mounted for sliding movements, to constitute a shifting fulcrum for the lever. The block 54 is moved along the slot 53 by means of a bell-crank lever 57, suitably fulcrumed below the bed of the machine, the inner end of said bell-crank lever having a link 56 pivoted thereto, which is in turn pivoted to a swinging arm 55, said arm having one end pivoted to a fixed point below the bed of the machine and its other end pivoted to the block 54. The outer extremity of the bell-crank lever 57 is arranged to move along a segmental guideway 60, see Figs. 9 and 13, and is herein shown as having a finger piece, or handle, 58, which is pivotally connected thereto at 57', as shown in Figs. 10 and 11. A sliding pawl 59, mounted near the end of the bell-crank lever, is provided with a stud 59' to which a spring 58' is connected whose opposite end may be secured to the end of the pivot 57'. By this means, the bell-crank lever may be moved in either direction along the segmental guideway 60, whereby to adjust the fulcrum block 54 near either end of the slot 53 and to retain it in the position to which it has been adjusted. The lever 50 is connected by a link 51 with the carriage 52, and said lever is provided with the inclined cam surface 49, heretofore referred to, between the slot 53 and its connection with the link 51, and has an outwardly-extending handle 61, herein shown as containing a sliding pawl 62 to be normally urged inwardly by a spring, whereby to engage with any one of a series of notches formed in the segmental guideway 63, or to frictionally engage the surface of a similar segmental guideway 63', said guideways being located a suitable distance apart on a curved portion of the side edge of the bed of the machine. This portion of the edge of the bed of the machine may, as shown in Fig. 1 of the drawings, be provided with a scale and the lever may carry a pointer 62' to travel thereover for indicating the position of the gages for different sizes and styles of vamps.

With the construction just described, when the bell-crank 57 has been moved to actuate the arm 55 and shift the fulcrum block 54 to the inner end of the slot 53, the lever 50 may be moved to the position shown in Fig. 9, where the gage 64 is positioned sufficiently near the markers to operate upon short vamps, as for instance, oxfords or bluchers, and the handle 61 may be moved along the segment 63 to the proper point to locate short vamps of various sizes in position for the markers. In this position of the lever 50 the cam surface 49 has engaged the roll 48 to move rearwardly the markers 320, the position of these markers longitudinally and transversely of the vamp being determined by the extent of the rearward movement of the lever 50, as heretofore explained. As short vamps have correspondingly short throat openings, when the gage 64 is in this position the members 65, 65, of the throat gage will be projected forwardly only a sufficient distance to properly enter such opening.

When it is desired to have the markers operate upon long vamps, as for Balmorals, or the like, the bell-crank lever 57 is moved to the position shown in Fig. 13, thereby causing the arm 55 to shift the fulcrum block 54 to a position at or near the outer end of the slot 53. The lever 50 is then moved forwardly, thereby causing the gage 64 to be brought to a position near the forward end of the bed, and in this position of the lever the pointer 62' may be moved along the guideway 63' to properly position the gage for long vamps of different sizes, the members 65, 65, of the throat gage being then adjusted to project beyond the face of the back gage the proper distance to fully enter the throat opening of the particular vamp being operated upon.

Fig. 19 of the drawing illustrates, diagrammatically, by the solid lines $a$, and the dotted lines $b$, the relation of a left hand vamp to a right hand vamp, which requires the shifting of the marking devices transversely of the machine in order to effect the proper location of the marks for the toe-caps of such vamps, the degree of the lateral adjustments being dependent upon the size and style of shoe in which the vamp is to be used.

In Fig. 20 the dotted lines indicated by the letter $c$ denote the position of a toe-cap for one style of vamp, and the dotted lines indicated by the letter $d$ denote the position of a toe-cap for a different style of vamp, the adjustments of the marking devices to accord with these and other positions being accomplished, as above described, by the mechanism which moves said devices longitudinally of the bed of the machine. In this view the different positions of the marks for indicating the points for the attachment of the quarters for Blucher shoes are referred to by the letter $e$, it being seen that the marks for the larger sizes are farther apart than those for the smaller sizes, and the adjustment of the auxiliary markers to accord with these variations in size is effected, as above described, by the mechanism shown in Figs. 9, 13 and 14 of the drawings.

In Fig. 21 the dotted lines $f$ indicate the position of a toe-cap for a left vamp, and the dotted lines $g$ indicate the position of the toe-cap for a right vamp, the inclination of said lines to the front edge of the vamp corresponding to the amount of "swing" required, and the position of the markers for such "swing" being controlled by the mechanism shown in Figs. 3, 15, 16 and 17, as above described.

From the foregoing description, it is believed that the operation of this machine and the manner in which the several adjustments are effected will be clearly understood. The vamp chart shown in Fig. 18 will guide the operator in making the adjustments proper for the three different kinds of vamp commonly used, said chart bearing numerals to indicate the adjustments for style, for right and left vamps, and for "swing" of any given size for each of these types. For example, if it is desired to mark a Blucher vamp bearing the size numbers $\frac{11}{c}$ #4½; the style appropriate for this size is indicated by the number 1¾, and the handle 28 would be rotated until the pointer 34 was opposite this number on the scale 36. To obtain the adjustment for "swing" the nut 24 would be loosened, the free end of the link 20 carrying the pointer 23 moved along the slot in the bracket 22 until the pointer was opposite the numeral 9 on the scale 22', and said nut rotated to secure the link in this position. To obtain the correct adjustment for right vamps and left vamps for this size, one of the pins 31 would be placed in the aperture 30, and the other of said pins in the aperture 27, in the plate 30. The operator after making such adjustments in accordance with this chart will then know that when the end of the lever 14 is elevated to depress the markers to mark a vamp, as shown in Fig. 1, the marks appearing thereon will indicate the correct position for the toe-cap as to style and "swing," and for a right vamp or for a left vamp, according to the position of the handle 29 whose movements in opposite directions will be limited by the pins 31. The construction and arrangement of the parts are such that upon the movement of the lever 50 to cause the gages 64, 65, to advance the vamp to proper position between the gages 9, 9, the surface 49 will contact with the roller 48, and the rod 46 and carriage 41 upon which are mounted the auxiliary markers 320, will be moved rearwardly, the inclined slots in the guides 43, 43, causing said markers to be automatically adjusted to the correct positions to indicate the points for the attachment of the quarters for such vamp. The fulcrum block 54 is moved nearer to the connection with the gage when making adjustments for short vamps in order to obtain a greater range of movement of the lever between the notches for the different sizes of such vamps as compared with the movements of the lever for different sizes of long vamps, whereby the adjustments for short vamps may be made with accuracy. In this connection, it is to be observed that the gage 64 must travel farther when moving between the different sizes of long vamps than when moving between corresponding sizes of short vamps.

A valuable characteristics of this invention which is herein shown as embodied in the auxiliary markers 320, shown in Fig. 22, consists in the mounting of the markers 320 in their carriers so that after having made an impression determined by the adjustment of a spring they will yield. This arrangement avoids liability that one marker will make a deep impression in a thick piece of stock which will leave an objectionable mark upon the work, while the other marker is being depressed only far enough to make the normal mark upon the average thickness of stock. In the arrangement shown in Fig. 22 the marking pin 320 has a collar 320' above the base plate of its bearing block and is surrounded by a spring $7^2$, the tension of which is determined by an adjustable nut $7^3$ having screw-threaded connection with the side walls of the carrying block. The nuts $7^3$ of the auxiliary markers may be adjusted in accordance with the requirement of the work and each marker will yield after having been pressed upon the work with a force determined by the adjustment of its spring. Preferably also the markers 320, 320 with their bearing blocks will be mounted in elongated slots in the arms 330 which will permit their adjustment lengthwise of the arms. This elongated slot facilitates the assembling of the parts with the markers in predetermined relation to one another and to the other parts of the machine.

Having thus described my invention, what I claim as new and desire to secure by Letters Patent of the United States is:—

1. In a machine of the class described, the combination with devices arranged to mark a vamp at separated points, of means associated therewith to control the distance of the marks from the edges of the vamp, said devices being supported for swinging movements toward and from the edges of the vamp.

2. In a machine of the class described, the combination with marking devices for indicating on a vamp the position for a toe-cap, of means associated with said devices for determining the distance of the marks from the edges of the vamp, said means being mounted for free movements simultaneously in opposite directions whereby they may open to receive a vamp or may close to engage and position the vamp relatively to the marking devices.

3. In a machine of the class described, the combination of marking devices for indicating on a vamp the position for a toe-cap and means associated with said devices for determining the distance of the marks from the edge of the vamp, said devices being supported for marking movements and said means being supported for free lateral movements in opposite directions, and a single device for effecting the lateral movements.

4. In a machine of the class described, the combination of devices for marking a vamp to indicate the position for a toe-cap and means associated with said devices for determining the distance of the marks from the edge of the vamp, said devices being supported for marking movements and said devices and means being supported for free lateral movements in opposite directions, and means extending toward the front of the machine and capable of effecting a simultaneous opening or closing movement of said parts by a single operation.

5. In a machine of the class described, the combination with a marker mounted for free swinging movements above the bed of the machine, of a gage associated with said marker and arranged to engage the edge of a vamp to be located on said bed.

6. In a machine of the class described, the combination with means to mark a vamp to indicate the position for a toe-cap, said means being supported for free lateral movements, of means to control the position of the marks relatively to the edge of a vamp.

7. In a machine of the class described, the combination of means to mark a vamp to indicate the position for a toe-cap, arranged for free lateral movements toward and from the work, of means to control the position of the marks relatively to two opposite edges of a vamp.

8. In a machine of the class described, the combination with means arranged for free lateral movements and constructed to mark a vamp to indicate the position for a toe-cap, of gages associated with said means, and arranged to engage the opposite edges of a vamp.

9. In a machine of the class described, the combination with marking means arranged for lateral swinging movements toward and from operative position, of gages associated with said means and arranged to engage the opposite edges of a vamp to determine the distance of the marks from said edges.

10. In a machine of the class described, the combination with marking means, of means supported for free swinging movements in opposite directions with said marking means and constructed to open to receive a vamp and to close to engage a vamp and position it relatively to the marking means.

11. In a machine of the class described, the combination with markers to indicate the position for a toe-cap, of gages associated therewith, said markers and their gages being arranged for free lateral movements to enable them to separate to receive a vamp and to approach each other, whereby the gages engage the opposite edges of a vamp and are adjustable for vamps of different widths.

12. In a machine of the class described, the combination with a pair of markers each of which is supported for movements about an axis, a gage associated with each marker and movable therewith, and means to cause simultaneous movements of the markers and their gages about said axes.

13. In a machine of the class described, the combination with a pair of markers supported for pivotal movements in a plane parallel with the bed of the machine, a gage associated with each marker and arranged to engage the edge of a vamp, and means to cause simultaneous movements of the markers and their gages in opposite directions.

14. In a machine of the class described, the combination with markers supported for pivotal movements about vertical axes, a gage associated with each marker and movable therewith, and means, including geared connections, for causing the markers and their gages to move in opposite directions about said axes.

15. In a machine of the class described, the combination with a support, pivots journaled in said support, and each carrying a marker and its associated gage, segmental gears connected with said pivots and intermeshing to insure simultaneous movements of the markers and their gages in opposite directions, an arm extending from one of said pivots, and operating means connected with said arm.

16. In a machine of the class described, the combination with markers mounted for pivotal movements toward and from the bed of the machine and also mounted for movements whereby to assume different positions over said bed, arms connected with said markers, and actuating means arranged to be moved into engagement with said arms and to remain in operative relation therewith as the markers are moved to different positions over the bed.

17. In a machine of the class described, the combination with markers, arms carried thereby supporting means for the markers constructed to permit them to move toward and from the bed of the machine and to different positions over said bed, and actuating means for the markers constructed and arranged to be moved into engagement with said arms and to remain in operative relation therewith throughout the several positions of adjustment of the markers over the bed.

18. In a machine of the class described, the combination with a bed, arms supported for movements toward and from said bed and carrying markers and rearward extensions, said arms being also arranged for movements to cause the markers to operate in different positions over said bed, and actuating means arranged for operative engagement with said extensions in any of the several positions of the markers.

19. In a machine of the class described, the combination with a bed, arms supported for movements toward and from said bed and carrying markers and rearward extensions, means to maintain the arms raised above the bed, said arms being also arranged for movements to cause the markers to operate in different positions over said bed, a lever pivoted to a support and carrying a rod, and grooved rolls slidable upon said rod and engaging said extensions.

20. In a machine of the class described, the combination with a bed, of a plurality of markers and associated edge gages located above said bed and arranged for free simultaneous movements transversely of the bed to position the markers for marking right and left vamps.

21. In a machine of the class described, the combination with a bed having guides therein, of a carriage movable in the guides transversely of said bed, means for shifting the carriage toward either side of the bed by a single movement, and markers supported on said carriage.

22. In a machine of the class described, the combination with a bed, of a carriage supported therein for free movements transversely of the bed and carrying markers, and means under the control of the operator for shifting said carriage whereby to position the markers for marking vamps for rights or lefts.

23. In a machine of the class described, the combination with a bed, a plurality of markers located above the bed, an edge gage associated with each marker, and supporting means for said markers and gages arranged to permit their simultaneous adjustment in either direction transversely of said bed for right and left vamps.

24. In a machine of the class described, the combination with a bed, of markers arranged above the bed and supported for simultaneous movements in either direction transversely thereof, and means to predetermine the extent of said movements.

25. In a machine of the class described, the combination with a bed, of markers arranged above the bed and supported for movements transversely thereof, a lever for causing said movements and extending in position for operation, and adjustable means to limit the movements of said lever.

26. In a machine of the class described, the combination with a bed, of markers arranged above the bed and supported for movements transversely thereof, a lever for causing said movements and extending in position for operation, a plate located adjacent the end of said lever and provided with a plurality of apertures denoting different positions of the lever, and stop-pins fitting said apertures and arranged to be projected to limit the movements of said lever.

27. In a machine of the class described, the combination of a bed, a carriage supported for movements transversely thereof, a frame sustained by said carriage and provided with a bracket, arms pivotally sustained by said frame for movements toward and from said bed and carrying markers and rearward extensions, and a lever fulcrumed in said bracket and carrying means to operatively engage said extensions.

28. In a machine of the class described, the combination with a bed, of marking means supported above said bed and arranged for adjustments for right or left vamps and simultaneously therewith for adjustments for swing.

29. In a machine of the class described, the combination with a bed, of marking devices located above said bed, and operating means arranged to effect movements of said marking devices transversely of the bed and simultaneously therewith to effect movements of said devices about a center.

30. In a machine of the class described, the combination with a bed, of marking devices located above said bed, supporting means arranged to permit movements of said marking devices transversely of the bed and simultaneously therewith to permit movements of said devices about a center, means to effect said movements and means to adjust the extent of the transverse movements.

31. In a machine of the class described, the combination with a bed, of marking devices located above said bed, supporting means arranged to permit movements of said marking devices transversely of the bed and simultaneously therewith to permit movements of said devices about a center, means to effect said movements, and means to adjust the extent of the movements about a center.

32. In a machine of the class described, the combination with a bed, of marking devices located above said bed, supporting means arranged to permit movements of said marking devices transversely of the bed and simultaneously therewith to permit movements of said devices about a center, means to effect said movements, and means to adjust the extent of said movements.

33. In a machine of the class described, the combination of a bed, a carriage supported for transverse movements thereon, a frame pivotally connected with said carriage, marking devices supported by said frame and arranged on opposite sides of said connection, and means to shift the frame transversely and to cause it to move about said connection, whereby to effect changes in position of said marking devices for right and left vamps, and for variations in swing.

34. In a machine of the class described, the combination of a bed, a carriage supported for transverse movements thereon, a frame pivotally connected with said carriage, marking devices supported by said frame and arranged on opposite sides of said connection, means connected with said carriage to effect its transverse movements, and means extending from said connection and adjustably connected with said first-named means to effect variable pivotal movements of the frame relatively to the carriage.

35. In a machine of the class described, the combination of a bed, a carriage supported for transverse movements thereon, a frame pivotally connected with said carriage, marking devices supported by said frame and arranged on opposite sides of said connection, a lever fulcrumed to the machine, and connected with said carriage to effect its transverse movements, said lever carrying a slotted member provided with a scale, an arm extending from said pivotal connection, and a link connected to said arm, said link having its opposite end adjustably connected to said slotted member and carrying a pointer to coöperate with said scale.

36. In a machine of the class described, the combination of a bed, a pair of markers located above said bed and an edge gage associated with each marker, and means for supporting said markers and their gages for movements transversely of the bed and for relative movements in opposite directions along the edges of a vamp.

37. In a machine of the class described, the combination of a bed, a pair of markers located above said bed and an edge gage associated with each marker, and means for supporting said markers and their gages for simultaneous movements transversely of the bed and for relative movements in opposite directions along the edges of a vamp.

38. In a machine of the class described, the combination of a bed, a pair of markers located above said bed and an edge gage associated with each marker, means for supporting said markers and their gages for movements transversely of the bed and for relative movements in opposite directions longitudinally of the bed, means to effect said movements and means to adjust the extent of said transverse movements.

39. In a machine of the class described, the combination of a bed, a pair of markers located above said bed and an edge gage associated with each marker, means for supporting said markers and their gages for movements transversely of the bed and for relative movements in opposite directions longitudinally of the bed, means to effect said movements and means to adjust the extent of said relative movements.

40. In a machine of the class described, the combination of a bed, a pair of markers located above said bed and an edge gage associated with each marker, means for supporting said markers and their gages for movements transversely of the bed and for relative movements in opposite directions longitudinally of the bed, means to effect said movements, and means to adjust the extent of said movements.

41. In a machine of the class described, the combination of a bed, a carriage supported for movements transversely thereof, a lever fulcrumed to a support movable longitudinally of the bed, said lever having one end connected with said carriage and its opposite end extended in position for operation, a second carriage supported by the first-named carriage for movements therein longitudinally of the bed and sustaining markers, and means in operative engagement with the fulcrum support and the last-named carriage for causing simultaneous movements of said parts longitudinally of the bed.

42. In a machine of the class described, the combination of a bed, a carriage supported for transverse movements thereof, a lever fulcrumed to a support slidably mounted for movements longitudinally of the bed, said lever having one arm connected with said carriage and its other arm extending to convenient position for operation, a carriage slidably mounted in said first named carriage for movements longitudinally of the machine, a frame sustained thereby and carrying spaced markers to indicate upon a vamp the position for a toe-cap, a bracket on said frame, a lever fulcrumed in said bracket and provided with means to actuate said markers, a block located in a transverse guideway in the last-named carriage, a rod having threaded engagement with said block and with said fulcrum support and extended in position for convenient operation, and means actuated by said rod to indicate the longitudinal position of said markers.

43. In a machine of the class described, the combination with means for marking a vamp to indicate the position for a toe cap, of means actuated thereby to mark a vamp to indicate the position for the quarters, said first-named means being movable into and out of operative relation with said last-named means.

44. In a machine of the class described, the combination with means for marking a vamp to indicate the position for a toe-cap, of means actuated thereby for marking a vamp to indicate the position for the quarters, and devices for moving the last-named means out of operative relation with the first-named means.

45. In a machine of the class described, the combination with a pair of markers for indicating the position for a toe-cap, said markers carrying projections, and a pair of markers for indicating the position for the quarters located below said projections, yielding means for normally elevating said markers, and means for depressing the toe-cap markers and thereby causing a depression of the markers for the quarters.

46. In a machine of the class described, the combination with auxiliary markers, of main markers arranged to be located in position to actuate said auxiliary markers and also arranged to be located out of such position.

47. In a machine of the class described, the combination with a bed, of means for marking a vamp to indicate the position for a toe-cap, and means actuated thereby to mark a vamp for indicating the position for the quarters, said first-named means being laterally movable whereby it may be arranged in position for actuating said last-named means or out of such position.

48. In a machine of the class described, the combination of a bed, markers to indicate the position for a toe-cap supported for marking movements above said bed and also for lateral movements, yielding means for elevating said markers, other markers supported for movements above the bed and adapted to indicate the position for quarters, yielding means for elevating said markers, said parts being so arranged that the first-named markers may occupy different lateral positions over the bed in order to be in or out of operative relation to the last-named markers.

49. In a machine of the class described, the combination of a pair of arms supported for pivotal movements above the bed of the machine and carrying markers to indicate the position for a toe-cap, yielding means for normally elevating said arms, means for sustaining said arms for movements in opposite directions in planes parallel with the bed of the machine, inwardly extending projections carried by said arms, a pair of arms sustained for pivotal movements toward and from the bed of the machine and carrying markers to indicate the position for quarters, said arms being arranged below said projections, yielding means for normally elevating said arms above the bed of the machine, means to effect lateral movements of the arms carrying the projections whereby to position said projections into or out of operative relation with the arms carrying the markers for the quarters, and means to depress the arms carrying the toe-cap markers whereby to cause a simultaneous depression of both sets of markers.

50. In a machine of the class described, the combination with markers to indicate on a vamp the position for the quarters, of mechanism to adjust said markers longitudinally and transversely of the machine.

51. In a machine of the class described, the combination with markers to indicate on a vamp the position for the quarters, of mechanism to position a vamp longitudinally with relation to said markers and to simultaneously adjust said markers to correct position for the size of vamp to be marked.

52. In a machine of the class described, the combination with markers to indicate on a vamp the position for the quarters, of a gage to position a vamp relatively thereto and mechanism to advance said gage and to simultaneously adjust said markers longitudinally and transversely of the machine whereby the position of the marks will be determined by the position of the gage.

53. In a machine of the class described, the combination of a set of markers to indicate the position for a toe-cap and edge gages associated therewith, a set of markers to indicate the position for the quarters, and mechanism to advance a vamp to both sets of markers and to adjust the position of the markers for the quarters to agree with the size of vamp operated upon.

54. In a machine of the class described, the combination with a bed, of a carriage supported for longitudinal movements thereon, brackets pivoted for horizontal movements on said carriage and having rearwardly extending members carrying pins, adjustable, divergent guideways for said pins, arms carrying markers movably supported on said brackets, and means for effecting movements of the carriage in opposite directions.

55. In a machine of the class described, the combination with a bed, of a carriage supported for longitudinal movements thereon, brackets pivoted for horizontal movements on said carriage and having rearwardly extending members carrying pins, divergent guideways for said pins, arms carrying markers movably supported on said brackets, and means for effecting movements of the carriage in opposite directions.

56. In a machine of the class described, the combination with a bed, of a carriage supported for longitudinal movements thereon, brackets pivoted for horizontal movements on said carriage and having rearwardly extending members carrying pins, divergent guideways for said pins, arms carrying markers movably supported on said brackets, yielding means to move said carriage forwardly, a gage to position a vamp relatively to said markers, and operating mechanism for said gage arranged to move said carriage rearwardly in opposition to said yielding means.

57. In a machine of the class described, the combination with a bed, of a carriage supported for longitudinal movements thereon, brackets pivoted for horizontal movements on said carriage and having rearwardly extending members carrying pins, divergent guideways for said pins, arms carrying markers movably supported on said brackets, a rod secured to said carriage and slidable in guideways on said bed, an adjustable stop on the rod arranged to abut against said bed, a spring on the rod confined between one of said guideways and a bracket on the rod, a roller carried by said bracket, an adjustable gage for positioning a vamp relatively to said markers, and operating mechanism for said gage arranged to engage the roller and move the carriage rearwardly simultaneously with the adjustment of the gage.

58. In a machine of the class described, the combination with a bed, of a carriage supported for longitudinal movements thereon, brackets pivoted for horizontal movements on said carriage and having rearwardly extending members carrying pins, divergent guideways for said pins, arms carrying markers movably supported on said brackets, a rod secured to said carriage and slidable in guideways on said bed, an adjustable stop on the rod arranged to abut against said bed, a spring on the rod confined between one of said guideways and a bracket on the rod, a roller carried by said bracket, an adjustable gage for positioning a vamp relatively to said markers, and a lever for actuating said gage, said lever having a cam surface to engage said roller, whereby to simultaneously effect a rearward movement of the carriage to adjust the position of the markers.

59. In a machine of the class described, the combination with markers to indicate the position for quarters, of means for independently adjusting said markers in directions transversely of the median line of the machine.

60. In a machine of the class described, the combination with arms independently supported for movements toward and from the bed of the machine, of markers sustained by said arms and arranged for adjustment thereon transversely of the median line of the machine.

61. In a machine of the class described, the combination of movable spaced arms carrying inwardly-extending projections and markers to indicate the position for a toe-cap, yielding means for elevating said arms movable spaced arms carrying ribs to engage said projections and markers to indicate the position for quarters, yielding means for elevating said arms, means for shifting the first-named arms transversely of the machine and means for depressing said arms whereby to actuate both sets of markers.

62. In a machine of the class described, the combination of movable spaced arms carrying inwardly-extending projections and markers to indicate the position for a toe-cap, yielding means for elevating said arms, edge gages associated with said markers, movable spaced arms carrying ribs to engage said projections and markers to indicate the position for quarters, yielding means for elevating said arms, means for shifting the first-named arms and their gages transversely of the machine, and means for depressing said arms whereby to actuate both sets of markers.

63. In a machine of the class described, the combination with independently movable arms carrying spaced markers to indicate the position for a toe-cap, edge gages associated with said markers, and means to engage the rear portion of a vamp to coöperate with said edge gages in positioning the vamp relatively to said markers.

64. In a machine of the class described, the combination with spaced markers to indicate the position for a toe-cap and edge-gages associated therewith, said markers and edge-gages being constructed to simultaneously separate to receive a vamp and to approach each other to permit the gages to engage a vamp, and means acting upon the rear portion of the vamp to position the same relatively to said markers and edge-gages.

65. In a vamp marking machine, the combination with a back-gage, of a throat-gage supported directly by the back gage and adjustably mounted relatively thereto.

66. In a vamp marking machine, the combination with a back gage, of a throat gage supported directly by the back gage and arranged for longitudinal adjustment therein.

67. In a vamp marking machine, the combination with a back-gage, of a throat-gage movably supported in the back gage and adjustable longitudinally and transversely relatively thereto, whereby to conform with throat openings of varying lengths and widths.

68. In a vamp marking machine, the combination with a back-gage, of a throat-gage comprising two members mounted for free sliding movements in said back-gage whereby to vary their amount of projection from the face of said back-gage.

69. In a vamp marking machine, the combination of a back-gage, blocks carried thereby, a throat-gage member supported for sliding movements in each of said blocks to vary its projection beyond said back-gage, and means for simultaneously adjusting said blocks and members in opposite directions transversely of the machine.

70. In a vamp marking machine, the combination of a back-gage, blocks carried thereby, a throat-gage member supported for sliding movements in each of said blocks to vary its projection beyond said back-gage, means for simultaneously adjusting said blocks and members in opposite directions transversely of the machine comprising racks pivoted to said blocks and a pinion meshing with said racks, and means to secure said parts in adjusted position.

71. In a vamp marking machine, the combination with marking means, of gaging means to position a vamp relatively to said marking means, actuating mechanism for said gaging means, including a lever having a movable fulcrum, and means for shifting said fulcrum, the parts being so arranged that the fulcrum is nearer the point of connection of said lever with the gaging means when the gaging means is in the position for short vamps than when the same is in position for long vamps.

72. In a vamp marking machine, the combination with marking means, of a gage to position a vamp relatively to said marking means, a lever having a slot near one end thereof and connected with said gage, an arm having one end pivoted to the bed of the machine and at its opposite end carrying a block movable in said slot, and means to move said arm for adjusting said block along the slot.

73. In a vamp marking machine, the combination with marking means, of a gage to position a vamp relatively to said marking means, a lever having a slot near one end thereof and connected with said gage, an arm having one end pivoted to the bed of the machine and at its opposite end carrying a block movable in said slot, a link connected with said arm, a bell-crank lever connected with said link and provided with an operating handle and a pawl, and a segmental guideway having notches to receive said pawl, whereby said block may be adjusted to position in the outer or inner end of said slot, and be secured in either of said positions.

74. In a vamp marking machine, the combination with marking means, of a gage to position a vamp relatively to said marking means, a lever having a slot near one end and a handle provided with a pawl and a pointer at its opposite end, a link connecting said gage with said lever at an intermediate point, a segmental guideway provided with notches to receive said pawl and a scale to coöperate with said pointer, a sliding block mounted in said slot, and means to adjust said block along the slot and to secure it in position when adjusted.

75. In a vamp marking machine, the combination with marking means, of a gage to position a vamp relatively to said marking means, a lever having a slot near one end thereof and connected with said gage, an arm having one end pivoted to the bed of the machine and at its opposite end carrying a block movable in said slot, a link connected with said arm, a bell-crank lever connected with said link and carrying at one end a sliding pawl, a movable pin for sustaining said pawl, a handle pivoted near said end of the bell-crank lever said handle being formed with an opening to loosely surround said pin and terminating in a thumb-piece, yielding means to actuate said pawl extending from said pin to a fixed point on the handle, and a segmental guideway having notches to coöperate with said pawl.

76. In a machine of the class described, the combination with a main marking device, of an auxiliary marking device arranged to be actuated by said main marking device in a direction transverse to the plane of the stock and means for supporting said auxiliary marking device constructed to permit it to yield relatively to the main marking device when pressed against the stock.

77. In a machine of the class described, the combination with a marking device for indicating the position for a toe cap, of a marking device for indicating the position for quarters arranged to be actuated by the first-mentioned marking device, and means for supporting the second-mentioned marking device arranged to permit said device to yield in response to pressure transmitted by said first-mentioned marking device.

78. A machine of the class described having means for marking a vamp, comprising a marking device, a carrier therefor, means for yieldingly holding the marking device in its carrier arranged to permit the marking device to move relatively to the carrier when pressed against the stock transversely to the plane thereof with a predetermined force, and a second marking device arranged to transmit such pressure to and thereby actuate said first-mentioned marking device.

79. A machine of the class described having, in combination, a plurality of vamp marking devices, carriers therefor, means for yieldingly holding the marking devices in their carriers arranged to permit said devices to move relatively to the carriers and other marking devices having means to engage and actuate said first-mentioned marking devices in a direction transverse to the plane of the stock.

80. In a machine of the class described, the combination with a bed, of a plurality of markers located above said bed and arranged for transverse movements to position the markers for marking right and left vamps, and a single device for simultaneously shifting said markers in either direction.

81. In a machine of the class described, the combination with a bed having guides therein, of a carriage movable in the guides transversely of the bed, markers supported on said carriage, and a single device for shifting the carriage in either direction.

82. In a machine of the class described, the combination with a bed, of a carriage supported therein for movements transversely of the bed and carrying markers, and means under the control of the operator for shifting said carriage predetermined distances in opposite directions, whereby to position the markers for right and left vamps.

83. In a machine of the class described, the combination with marking devices of means associated therewith for determining the distance of the marks from the edges of a vamp, said devices and means being arranged for simultaneous movements transversely of the machine to position said devices for right and left vamps and said devices being also arranged for marking movements.

84. A vamp marking machine comprising, in combination, marking devices, and gages associated therewith for determining the position of marks relatively to the edges of a vamp, said marking devices and gages being arranged for simultaneous pivotal movements in a direction parallel with the bed of the machine and said marking devices being also arranged for movements toward and from said bed for marking the stock.

85. In a machine of the class described, the combination with a pivotally-supported arm, a marking device carried thereby, means between said marking device and arm which permits relative yielding movement of said parts when the marking device is pressed against the stock, and a second marking device adapted to engage said arm and press the first mentioned marking device against the stock in a direction to cause such yielding movement, said parts being so arranged that the first-mentioned marking device will engage the stock in advance of the other marking device.

86. In a machine of the class described, the combination with pivotally supported arms, marking devices carried thereby, means between each marking device and its supporting arm which permits relative yielding movements of said parts when the marking devices are pressed against the stock, and other marking devices adapted to engage said arms and actuate the first-mentioned marking devices transversely to the plane of the stock, said first-mentioned marking devices marking the stock in advance of the last-mentioned marking devices.

87. A machine of the class described having, in combination, means for indicating on a vamp the position for a toe cap, a back gage for positioning a vamp relatively to said means, and adjusting means for said gage including a lever having a shifting fulcrum which may be so positioned as to provide for closer adjustments of the gage when it is acting on short vamps than when it is acting on long vamps.

88. In a machine of the class described, the combination with main markers of auxiliary markers which are arranged to be pressed against the stock by force transmitted through the main markers in a direction transverse of the plane of the stock, means for supporting the auxiliary markers constructed to permit them to yield relatively to the main markers, said main markers being also arranged for actuation to mark the stock without actuating the auxiliary markers.

In testimony whereof I have signed my name to this specification in the presence of two subscribing witnesses.

PERLEY R. GLASS.

Witnesses:
ARTHUR L. RUSSELL,
MARY E. MENDUM.

Copies of this patent may be obtained for five cents each, by addressing the "Commissioner of Patents, Washington, D. C."